United States Patent [19]
Weinem

[11] Patent Number: 5,427,681
[45] Date of Patent: Jun. 27, 1995

[54] OIL REMOVAL DEVICE

[75] Inventor: Hannelore Weinem, Wilhelmshaven, Germany

[73] Assignee: Gutec mbH Gesellschaft für Umweltschutz und Technik, Wilhelmshaven, Germany

[21] Appl. No.: 952,748

[22] PCT Filed: Mar. 20, 1992

[86] PCT No.: PCT/EP92/00614

§ 371 Date: Jan. 4, 1993

§ 102(e) Date: Jan. 4, 1993

[87] PCT Pub. No.: WO92/16693

PCT Pub. Date: Oct. 1, 1992

[30] Foreign Application Priority Data

Mar. 20, 1991 [DE] Germany ............... 41 09 577.4

[51] Int. Cl.$^6$ ............................................. E02B 15/04
[52] U.S. Cl. ................................. 210/241; 210/242.3; 210/396; 210/402; 210/DIG. 5
[58] Field of Search ............... 210/241, 242.3, 242.4, 210/923, DIG. 5, 402, 396

[56] References Cited

U.S. PATENT DOCUMENTS

| | | | |
|---|---|---|---|
| 2,242,861 | 5/1941 | Keene | 210/396 |
| 3,612,277 | 10/1971 | Van Stavern et al. | 210/242.3 |
| 3,685,653 | 8/1972 | Van Stavern et al. | 210/242.3 |
| 3,850,807 | 11/1974 | Jones | 210/923 |
| 4,220,533 | 9/1980 | Baer et al. | 210/242.3 |
| 4,360,429 | 11/1982 | Morris | 210/242.3 |
| 4,473,469 | 9/1984 | Ayroldi | 210/242.3 |
| 4,514,299 | 4/1985 | Ayroldi | 210/242.4 |
| 4,681,680 | 7/1987 | Delons et al. | 210/242.3 |

Primary Examiner—Cynthia L. Nessler
Attorney, Agent, or Firm—Collard & Roe

[57] ABSTRACT

A device for removing oil and oily substances from a liquid, in particular water, has at least one open-ended tube that can be at least partially submerged into the oil-contaminated liquid to receive the liquid and that rotates around its longitudinal axis. The surface of the wall of the tube is treated so that it is particularly effective in retaining oil and oily substances. In addition, at least one scraping element that lies against the wall of the tube scrapes oil and oily substances away from the wall of the tube and transmits them to a collecting reservoir.

9 Claims, 2 Drawing Sheets

OIL REMOVAL DEVICE

BACKGROUND OF THE INVENTION

1. Field of the Invention

The invention relates to a device for removing oil or oil-containing substances from a foreign liquid, in particular water, with a system for collecting the oil.

2. The Prior Art

Such devices are known in many different forms and are mainly used for cleaning oil-contaminated waters or seas. A major part of the known plants operates according to the suction principle, with exploitation of the knowledge that oil is lighter than water and floats on the surface of water. Before the oil is drawn off the surface of the water by suction, so-called oil barriers, for example in the form of inflatable hoses are put into place with most of the conventional plants, within which barriers the oil can be collected on the surface of the water. Furthermore, an oil-collecting ship has been built in the meantime, which is divided in two halves in the direction of travel, which halves are connected with one another in the stern zone via a joint. For removing the oil by suction, the two halves are folded apart and then serve as a collection barrier for the oil. Said oil-collecting ship is currently operating under the name "Mellum".

However, it has been found that the known plants have only a relatively low collection capacity and that they, therefore, do not operate very efficiently. They are thus usable only for cleaning locally contaminated water, thus waters with a relatively small contaminated area. For cleaning larger waters or even seas such as, for example the currently oil-contaminated Persian Golf, the known plants and devices are overtaxed because the cleaning would take months to years in such cases. Furthermore, the known plants and devices are quite complicated in their structure and thus susceptible to maintenance.

Also, chemical cleaning of oil-contaminated water has been proposed on various occasions. In connection with one of said processes, chemical additives are added to the water for the purpose of bonding the oil. However, in such a case, the chemical additives bonding the oil must then be removed, which is no less problematic than the direct removal of the oil. Another problem is that a major part of the chemical binding agents is not compatible with the environment as well.

SUMMARY OF THE INVENTION

Therefore, the object of the invention is to create a more efficient and structurally simpler device of the afore-mentioned type for removing oil or oil-containing substances from a liquid, in particular water, without chemical treatment of the oil.

Said object is resolved in that a device of the afore-mentioned type comprises at least one tube which is at least partially immersible in the oil-contaminated liquid, open at the ends for receiving the liquid, and rotatable around its longitudinal axis, with its walls being treated on their surface in such a way that they are particularly favorable to adhesion vis-a-vis oil and oil-containing substances; and at least one stripping element resting against the wall of the tube for stripping the oil and the oil-containing substances from the wall of the tube and passing them on to a collecting system.

Accordingly, the device according to the invention contains at least one tube that is at least partially immersed in the oil-contaminated liquid. So that the oil-contaminated liquid can flow through the tube, the latter is open at both ends. The surface of the wall of the tube is treated in such a way that it is particularly favorable to adhesion vis-a-vis and oil-containing substances. In this way, oil and oil-containing substances can particularly readily deposit on the walls of the tube, whereas the actual liquid is substantially repelled. In order to remove the oil and the oil-containing substances from the walls of the tube and pass them on to the collecting system, provision is made for at least one stripping element. The stripping element rests against the wall of the tube. The stripping effect is achieved by a relative motion of the stripping element and the tube, which is rotated around its longitudinal axis and its wall is passed along the stripping element, which then removes the oil from the wall of the tube.

The invention works in a significantly more efficient way and has a significantly higher take-up capacity than the known plants. In this connection, there is no need to additionally treat the oil in the device of the invention in chemical or another ways. Furthermore, the oil can be removed also from deeper layers of the liquid. Another important advantage of the invention lies in its simple construction, which has an extremely favorable effect on the manufacturing and operating costs. Based on all of said features the invention offers a significantly more economical oil removal than the state of the art. In addition, because of its simple structure the device according to the invention can be disassembled into its individual parts in a particularly simple manner and thus quickly transported to the location it is used without much expenditure.

Preferably, the wall of the tube is coated with a material that is particularly favorable to adhesion vis-a-vis oil and oil-containing substances. Alternatively, the surface of the wall of the tube can also be polished to a high gloss. These are particularly suitable measures in order to be able to bond the oil or the oil-containing substances to the wall of the tube, whereby the actual liquid is at least substantially repelled at the same time.

With an embodiment of the invention that is presently particularly preferred, several tubes are combined in a nest of tubes and, in this connection, arranged one in the other and with a spacing between each other. With said embodiment it is possible to achieve a consirable increase of the capacity by multiple times while maintaining at the same time a relatively compact structure. In this connection, the tubes can be arranged particularly coaxially relative to one another. It has been found that this embodiment works particularly efficiently if provision is made for driving means for rotating the tubes, which means drive the tubes independently of one another in such a way that two adjacent tubes contrarotate in each case relative to one another and/or that the angle-of-rotation speed of the tubes decreases with the increase in diameter.

With another useful embodiment of the invention, the stripping element or elements is/are arranged substantially stationary vis-a-vis the axis of rotation of the tube or tubes. Thus the stripping effect is achieved in this case by the relative motion between the rotating tube and the stationary stripping element. Yet the stripping element can be moved also vis-a-vis the wall of the tube itself.

With another currently particularly preferred embodiment of the invention, the stripping element or elements is/are arranged in such a way, and the tube or tubes is/are immersed in the liquid in such a way that the stripping elements are disposed outside the liquid. Said embodiment permits a particularly simple design of the stripping elements especially with respect to the further conveyance of the oil received to the collecting system. In this connection, the stripping elements should usefully have the form of drains permitting a particularly simple further conveyance of the stripped oil to the collecting system.

The stripping element or elements can preferably extend in the longitudinal direction of the rotor and across the total length of the tube, whereby they can extend parallel with the longitudinal axis of the tube in order to obtain a particularly good stripping effect.

The tube or tubes should be moved substantially in the longitudinal direction so that the oil-contaminated liquid can flow through the tubes. In this way, the previously cleaned liquid can be exchanged in a particularly simple way for liquid that is still contaminated and to be cleaned, which permits a continuous cleaning of the total liquid. Furthermore, the flow resistance is the lowest when the tube or tubes are moved through the liquid in the longitudinal direction, particularly if the stripping element or elements extend in the longitudinal direction of the tube or tubes as well. Alternatively, however, the tube or tubes need not to be moved in running waters but can be anchored, because a flow of the liquid through the tubes is assured due to the flow of the water.

With a useful further development of the invention, the tube or tubes is/are supported on a floating body, which is provided either with an own drive for moving through the liquid, or with means for dragging the floating body through the liquid with the help of external vehicles or drives.

BRIEF DESCRIPTION OF THE DRAWINGS

A preferred exemplified embodiment of the invention is explained in greater detail in the following on the basis of the figures attached hereto, in which.

DETAILED DESCRIPTION OF THE PREFERRED EMBODIMENTS

A device for removing oil and oil-containing substances from sea water is described in the following. However, such a device can be basically used also for cleaning any other oil-contaminated liquid.

Figure 1:
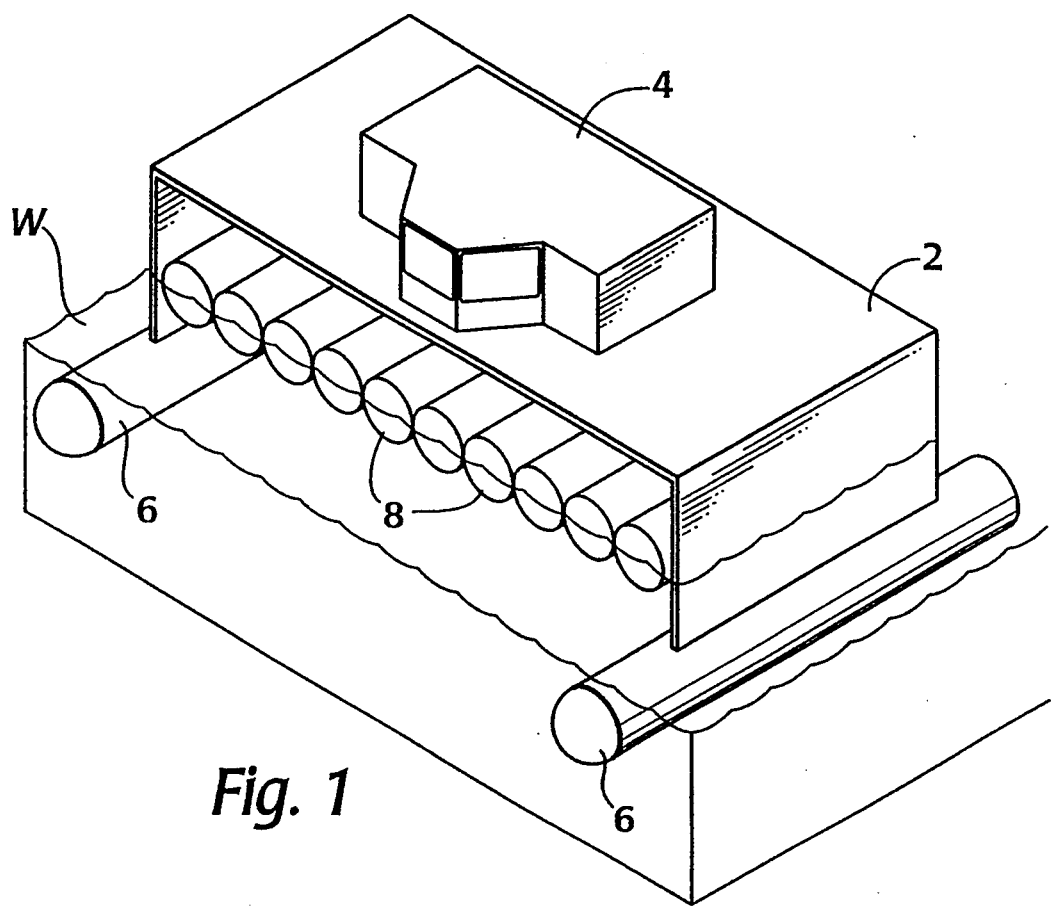
FIG. 1 is a schematic perspective representation of an oil removal device.

Such a device is schematically shown in FIG. 1 in its totality. FIG. 1 shows that the device is embodied in the form of a floating vehicle, which has a box-shaped hull 2. A bridge or operator's cabin 4 is placed on the box-shaped hull 2, from which cabin the entire device is controlled. Yet the device can be controlled also remotely. In order to obtain the required buoyancy, the device of the exemplified embodiment shown is fitted with the two floats 6. The floats 6 contain chambers not shown, and a suitable compensation tube, which permits an exact trimming of the floating position.

FIG. 1 shows, furthermore, that several nests of tubes 8 are accommodated in the box-shaped hull 2. The nests of tubes 8 are disposed next to each other in a horizontal plane with their longitudinal axes extending parallel with one another. The nests of tubes 8 are open at their ends, The box-shaped hull 8 is designed and the nests of tubes 8 are arranged within the hull 2 in such a way that upon upon immersion in water, the latter can flow through the nests of tubes 8.

Figure 2:
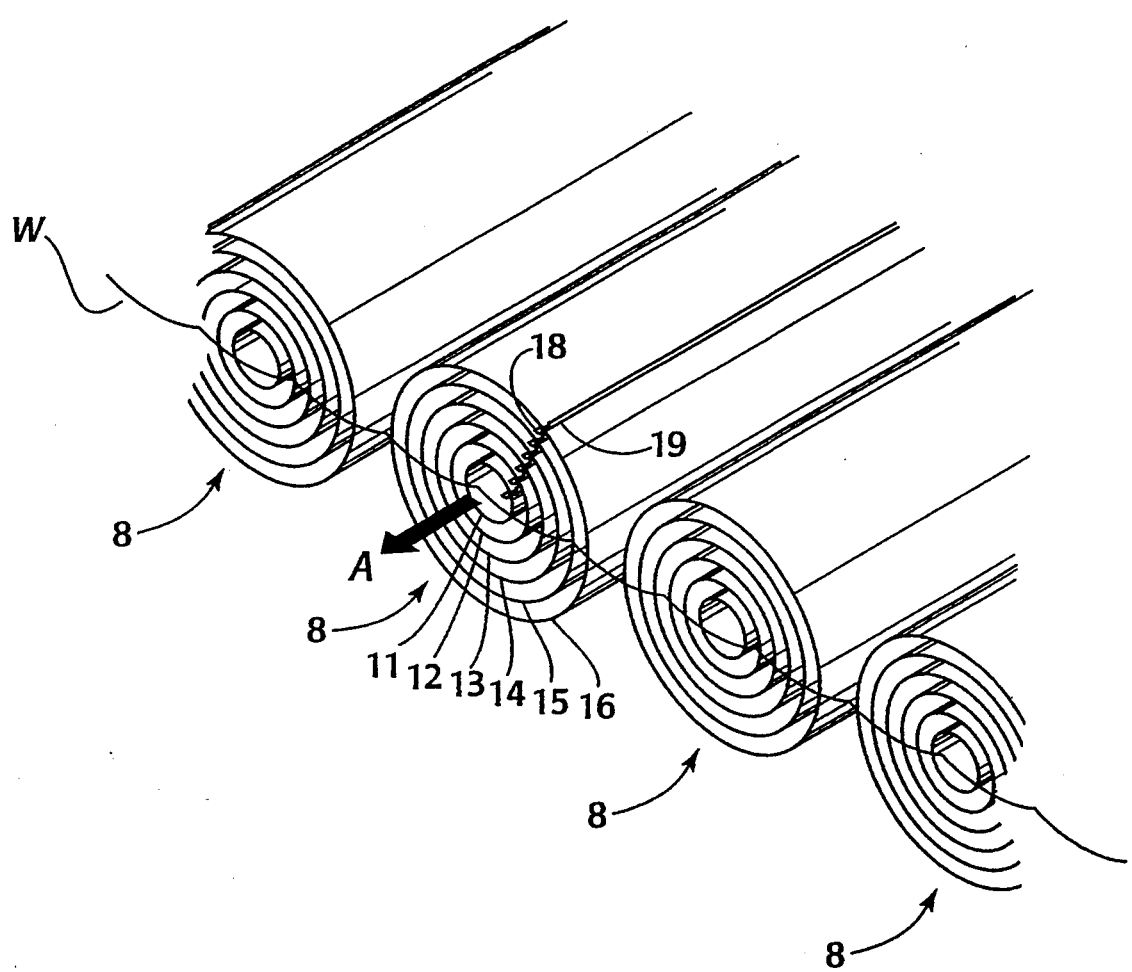
FIG. 2 is a schematic perspective view of the nests of tubes used in the oil removal device.

FIG. 2 shows an enlarged individual view of the nests of tubes 8, whereby for reasons of clarity, only the interesting elements of the second nest of tubes from the left are provided in FIG. 2 with reference numerals, because all nests of tubes 8 are structured in the same way. In the exemplified embodiment shown, each nest of tubes 8 consists of six individual tubes 11 to 16. In this connection, the tubes 11 to 16 are arranged one in the other and coaxially spaced from one another. As the tubes 11 to 16 have a cylindrical shape, all axes of the tubes 11 to 16 are consequently disposed on one common axis forming the longitudinal axis of each of the nests of tubes 8.

The walls of the individual tubes 11 to 16 are treated on their surface in such a way that they are particularly favorable to adhesion vis-a-vis oil and oil-containing substances. In particular, the walls of the tubes 11 to 16 can be provided with a special coating that is particularly favorable to adhesion vis-a-vis oil and oil-containing substances. Alternatively, the surface of the walls of the tubes 11 to 16 can be polished to a high gloss as well.

The individual tubes 11 to 16 are rotatably supported. They may be supported, for example by rollers (not shown) supported in ball bearings and coated with rubber, said rollers running in a deepening formed in the tubes. Furthermore, provision is made for driving means not shown in detail, which put the individual tubes 11 to 16 into rotation. The driving means are accommodated in the hull 2 and can drive the individual tubes 11 to 16, for example via Teflon toothed gears not shown in detail, which gears mate with bent Teflon toothed racks, the latter being mounted on the tubes along their circumference. Preferably, electric motors are selected as driving means.

The driving means drive the individual tubes 11 to 16 independently of one another and are controlled in this connection by controlling devices not shown in detail, in a way such that two adjacent tubes contrarotate in each case relative to one another, and that the angle-of-rotation speed of the tubes 11 to 16 decreases with the increase in diameter. Thus the innermost tube 11 has the highest number of revolutions, whereas the outermost tube 16 is driven with the lowest number of revolutions.

Furthermore, provision is made for oil stripping drains resting on both sides against the wall of each tube. For reasons of clarity, only the inner and outer oil stripping drains associated with the outermost tube 16 are shown, denoted by the reference numerals 18 and 19. With the exemplified embodiment shown, the oil stripping drains 18, 19 extend parallel with the axis of rotation of the associated tube across the entire length of the latter. In addition, in the exemplified embodiment shown, said drains are arranged stationarily vis-a-vis the axis of rotation of the tubes 11 to 16, and fastened on the hull 2.

Figure 3:
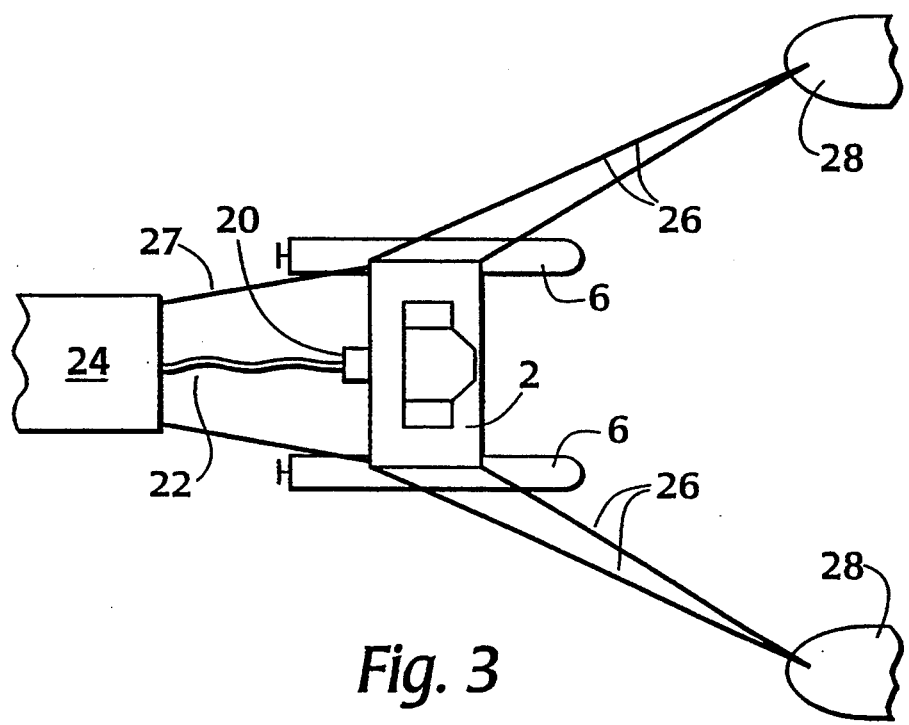
FIG. 3 shows a top view of the oil removal device in the schematic form.

FIG. 3 shows a top view of the total arrangement of the device with additional devices. On the back side of the box-shaped hull 2, provision is made for an oil collecting sump 20, to which the individual oil stripping drains of the nests of tubes 8 are connected. The oil collecting sump 20 is in turn connected via a hose line 22 with a collecting system 24 present behind the box-shaped hull 2. The embodiment shown in FIG. 3 is intended to be dragged through the water with the help of trawlers. For this purpose, provision is made for the hawsers 26, 27, by way of which the box-shaped hull 2 and the collecting system 24 disposed behind said hull are dragged by the trawlers 28, of which only the stern is shown in FIG. 3.

Alternatively, the device can be fitted also with its own drive. Said drive can consist, for example of one or a plurality of electric motors, which usefully can be accommodated in the floats 6.

The mode of operation of the device described in the foregoing is briefly explained in the following.

In connection with the described exemplified embodiment, the floating position of the hull 2 is trimmed in such a way that the nests of tubes 8 and thus the individual tubes 11 to 16 are immersed approximately half way, so that their axes of rotation are substantially disposed on the surface W of the water, as shown in FIGS. 1 and 2. Now, the device is dragged through the water in such a way that the nests of tubes 8 and thus the individual tubes 11 to 16 are moved through the water in the direction of their axes, thus in the direction of the arrow A shown in FIG. 2. FIG. 2 shows, furthermore, that the oil stripping drains 18, 19 are arranged in such a way that in the exemplified embodiment, all of said drains are disposed above the surface W of the water.

The water flows through the nests of tubes 8 as the device is being dragged through the water. As the walls of the individual tubes 11 to 16 are particularly favorable to adhesion vis-a-vis oil and oil-containing substances, oil and oil-containing substances now deposit on the walls of the tubes. At the same time, the tubes rotate around their longitudinal axes as described in the foregoing. In this way, the oil deposited on the walls of the tubes is carried along substantially without the water until it reaches the oil stripping drains 18, 19 where the oil and the oil-containing substances are stripped from the walls of the tubes by the oil stripping drains 18, 19. The oil or the oil-containing substances collected by the oil stripping drains 18, 19 are now passed on by the oil stripping drains 18, 19 to the oil collecting sump 20 (see FIG. 3). The walls of the tubes cleaned by the oil stripping drains 18, 19 are now ready for depositing further oil or further oil-containing substances from the liquid following through the tubes 11 to 16. The cleaning process now repeats itself again, so that a continuous cleaning can be carried out as the device continues to move through the water.

I claim:

1. Device for removing oil and oil-containing substances from a liquid contaminated with the oil and oil-containing substances, the device comprising:
    a collecting system defining means for collecting the oil and oil-containing substances;
    said system including several tubes at least partially immersible in said liquid, each of said tubes having opposite open ends and a longitudinal axis, said device further comprising means for rotating each of said tubes around said longitudinal axis, each of said tubes further having a wall with inside and outside surfaces, the surfaces of the wall of each of the tubes being treated, the treated surfaces providing means for adhering the oil and oil-containing substances to the wall;
    at least one stripping element resting against the wall, said at least one stripping element providing means for stripping the oil and oil-containing substances from the surfaces of the wall of each of the tubes and for passing the oil and oil-containing substances from the collecting system; and
    said tubes being combined into nests of tubes one within another in mutually spaced relation.
2. Device according to claim 1,
    wherein said tubes of the nest of tubes are arranged coaxially with respect to each other.
3. Device according to claim 1,
    wherein said means for rotating further comprises driving means for rotating the tubes of the nest of tubes for rotation around said longitudinal axis in such a manner that each two adjacent tubes nested one within another contrarotate relative to one another.
4. Device according to claim 1,
    wherein said means for rotating further comprises driving means for rotating the tubes of each nest of tubes for rotation around said longitudinal axis in such a manner that the angular speed of rotation of the tubes of the nest of tubes decreases as the tube diameter increases.
5. Device according to claim 1,
    wherein said at least one stripping element comprises a drain.
6. Device according to claim 1,
    wherein said at least one stripping element extends in the longitudinal direction of each of the tubes.
7. Device according to claim 6,
    wherein said at least one stripping element always extends parallel to the longitudinal axis of each of the tubes.
8. Device according to claim 1,
    wherein the surfaces of the wall of each of the tubes are of a high gloss.
9. Device according to claim 1,
    further comprising means for moving the tubes substantially in the longitudinal direction.

* * * * *